United States Patent [19]

Sigel et al.

[11] 3,899,233

[45] Aug. 12, 1975

[54] CONTACT HEAD FOR ELECTRICALLY MONITORING A PLURALITY OF POINTS IN A CIRCUIT

[75] Inventors: Pierre Louis Sigel, Villeneuve-le-Roi; Henri Grosjean, Le-Plessis-Trevisse, both of France

[73] Assignee: Compagnie Honeywell Bull, Paris, France

[22] Filed: Mar. 8, 1974

[21] Appl. No.: 449,567

[30] Foreign Application Priority Data

Mar. 16, 1973 France .............................. 73.09560

[52] U.S. Cl. .......... 339/59 M; 324/72.5; 339/61 M; 339/108 TP; 339/150 T; 339/218 M
[51] Int. Cl.² G01R 31/02; H01R 11/02; H01R 9/08
[58] Field of Search ....... 339/45 R, 45 M, 48, 49 R, 339/49 B, 58, 59 R, 59 M, 61 R, 61 M, 108 TP, 150, 151, 218, 275 R, 275 B, 275 T; 324/72.5, 158 P

[56] References Cited
UNITED STATES PATENTS

| | | | |
|---|---|---|---|
| 2,259,799 | 10/1941 | Corrigan ........................... | 339/45 R |
| 2,438,350 | 3/1948 | Reichard................... | 339/108 TP X |
| 3,676,776 | 7/1972 | Bauer et al. ................. | 324/158 P X |
| 3,718,887 | 2/1973 | Solomon et al. ................ | 339/218 M |
| 3,835,442 | 9/1974 | Anderson et al.................. | 339/59 R |

OTHER PUBLICATIONS

IBM Tech. Disclosure Bulletin; M. R. Eddy; "Multi-probe Testing Device"; Sept., 1969; Vol. 12, No. 4; p. 539.
IBM Tech. Disclosure Bulletin; R. L. Bullard et al.; "Microminature Circuit Test probe"; Jan., 1970; Vol. 12, No. 8; pp. 1164–1165.

*Primary Examiner*—Joseph H. McGlynn
*Assistant Examiner*—Craig R. Feinberg
*Attorney, Agent, or Firm*—David A. Frank; Ronald T. Reiling

[57] ABSTRACT

Contact head for simultaneously contacting a plurality of points in an electrical circuit, said head comprising a rigid insulating support provided with a plurality of parallel holes passing entirely through said support, a plurality of pins each adapted for sliding in one respective of said holes, and a block of elastic material attached to said support. Each pin has one of its two ends connected to a connecting lead, said end being embedded in said block, while its other end projects from said support to be applied against one of the points of the electrical circuit.

3 Claims, 4 Drawing Figures

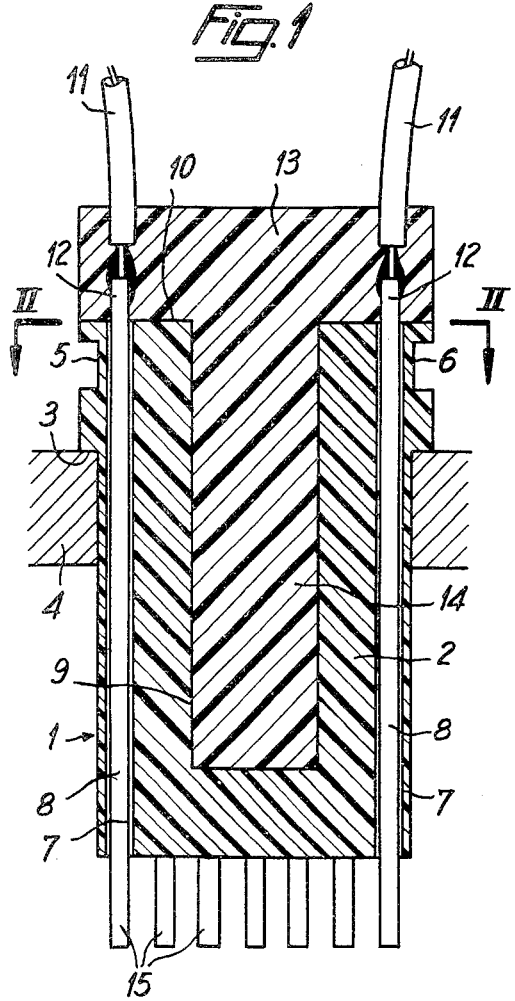
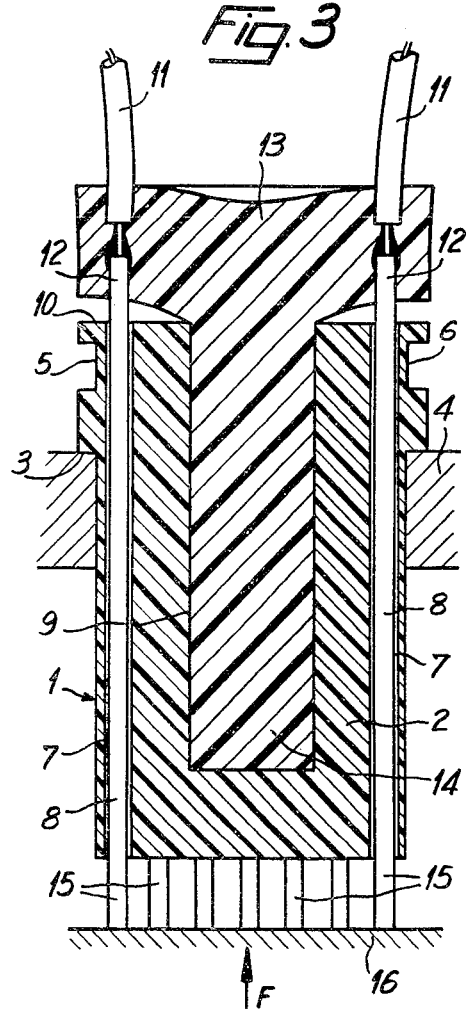
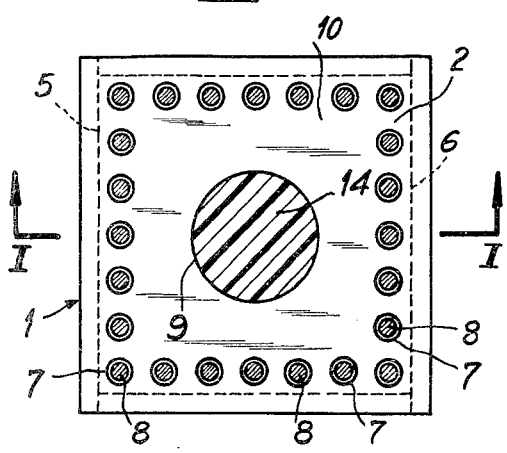
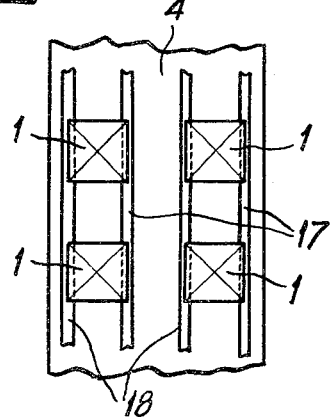

CONTACT HEAD FOR ELECTRICALLY MONITORING A PLURALITY OF POINTS IN A CIRCUIT

BACKGROUND OF THE INVENTION

The present invention relates to a contact head for monitoring a plurality of contact points in an electrical circuit simultaneously. It is more particularly, although not exclusively, intended for monitoring highdensity electrical circuits.

Heads are already known for monitoring a plurality of points in an electrical circuit simultaneously. Such heads contain a plurality of parallel pins the ends of which all press against the said contact points simultaneously. In order to ensure that contact pressure is practically the same on all the points, it is essential for these pins to be longitudinally elastic so as to compensate for the inevitable differences in length between the pins or in the thickness of the said contact points. To this end, in known heads the pins are telescopic and are in two sections connected together by a coil spring.

Heads of this type have certain disadvantages. Firstly, because the pins are telescopic, diameter is considerable at least in the region where the joint between the two sections is situated due to the fact that one of the sections has to contain a seating in which the said spring is housed and into which the other of the said sections fits. As a result, the density with which pins can be packed into a head is restricted by the diameter of the seatings. Furthermore, when checks are made at high frequencies, the spring acts as an inductance and upsets the electrical measurements.

The present invention substantially reduces or overcomes these drawbacks.

SUMMARY OF THE INVENTION

In accordance with the invention a contact head for electrically monitoring a plurality of points in a circuit which contains a plurality of parallel pins, the ends of which all bear simultaneously on said points, is characterized in that it comprises a rigid support provided with a plurality of parallel holes in each of which one of the said pins is free to slide, the pins projecting from said support at one end and being secured at the other end to a block of elastic material which is itself attached to said rigid support.

Thus, the contact pins may be simple rods and therefore may be small in diameter, which enables the pins to be packed close together in the head. In addition their diameter may be even further reduced due to the fact that the pins are guided in the support for almost their whole length and that only a part of their end projects from said support.

When a pressure is exerted on said pins (by the reaction force set up by a rigid electrical circuit, such as an integrated or hybrid circuit), they retract into the support and the end opposite to that in contact with said circuit deforms the said block elastically.

In order to increase elastic action of the said block even more, the latter is fixed to the support only by at least one portion which is independent of said pins. Thus, in the area in which the pins are situated, the block is able to move away from said support when a pressure is exerted on the pins.

Advantageously, the pins are distributed around the periphery of the support while the block is secured in the central region thereof. To this end the support may contain a central hole in which a proturberance on said elastic block is held in place by a force fit. To produce a fixing of this type, said block may be moulded onto a rigid support which has already been provided with its central hole. Preferably the elastic block rests against the support and the surface of the support on which said block rests is plane.

BRIEF DESCRIPTION OF THE DRAWINGS

The invention will now be further described, by way of example, with reference to the accompanying drawings in which:

FIG. 1 is a longitudinal cross-section of one embodiment of a head according to the invention.

FIG. 2 is a cross-sectional view along line II—II of FIG. 1.

FIG. 3 is a similar view to that in FIG. 1 showing the effects of exerting a pressure on the pins in the head.

FIG. 4 is a schematic view from above showing the way in which a number of heads according to the invention are mounted in a head-supporting panel.

DESCRIPTION OF THE PREFERRED EMBODIMENT

The contact head 1 shown in FIGS. 1, 2 and 3 comprises a rigid support 2 of parallelepiped shape, which may be made of a synthetic resin, for example. The support 2 is made up of two parts of differing crosssectional dimensions which merge at a shoulder 3 intended to enable it to be supported against the edges of openings made in a head-supporting panel 4. In addition, opposing grooves 5 and 6 are provided in the part of larger cross-sectional dimensions and these, as will be seen below, are used to secure the said head to the panel 4.

Around the periphery, the support contains parallel cylindrical holes 7 which pass entirely through it and in which pins 8 which are made of brass for example, are free to slide. These pins 8 extend through the support 2 and their upper ends 12 and lower ends 15 appear respectively at opposite ends of the support.

In the central area of the support is provided a blind longitudinal hole 9 which is open at the upper plane face 10 of the said support. At the end corresponding to face 10, the ends 12 of the pins 8 are soldered to flexible connecting leads 11 which extend to electrical test and measuring apparatus (not shown).

The ends 12 of the pins 8 and part of the leads 11 are embedded in an elastic block 13 which is made of a flexible synthetic material, for example, and which has a protuberance 14 which is a force fit in the blind hole 9. This block 13 rests against face 10 and holds the pins 8 secured to the support 2. It may be moulded or cast onto the support after the pins 8 have been positioned in their respective holes 7.

When the lower ends 15 of the pins 8 are pressed against a rigid surface 16 (an integrated or hybrid circuit for example) which exerts a reaction force F (see FIG. 3), the pins 8 slide upwards through the support 2 and their ends 12 deform the block 13 elastically and lift the edge of the block away from the supporting surface 10. In this way block 13 gives the pins 8 a certain amount of longitudinal elasticity.

When the reaction force F is no longer present the block 13 returns pins 8 to the position shown in FIG. 1.

FIG. 4 is a view from above of part of the panel 4 for carrying a plurality of heads. Four heads 1 project through suitable openings in this panel and are supported on the edges of these openings by their shoulders 3. Fixing bars 17 and 18 which are secured to the panel 4, fit respectively into the aligned grooves 5 and 6 on a pair of adjacent heads 1.

We claim:

1. A contact head for simultaneously contacting a plurality of points in an electrical circuit, said head comprising:
   - a central hole and a rigid insulating support in the form of a parallelepiped and provided with a plurality of holes passing entirely through said support in a direction parallel to the length of said parallelepiped, and opening on two opposite surfaces of said support, said holes being distributed around the periphery of said support,
   - a plurality of pins each adapted for sliding in one respective of said holes, each pin having one of its two ends projecting from said support at one of said opposite surfaces, and its other end projecting from said support at the other surface and soldered to a connecting lead,
   - and a block of elastic material disposed against said other surface of the support, said block having a protuberance positioned within said central hole of said support, said block embedding said soldered ends of the pins and exerting an elastic action on said pins when the pins have their free ends pressed against said circuit.

2. In combination, a plurality of contact heads according to claim 1, and a support panel for supporting said heads, wherein each contact head further comprises at least two grooves provided on both sides of the insulating support and transversely to the direction of the pins, for receiving fixing bars secured to said support panel and engaged in said grooves.

3. A contact head as in claim 1 wherein said protuberance is force fit within said central hole.

* * * * *